United States Patent Office 2,795,564
Patented June 11, 1957

2,795,564

AQUEOUS PAINT BASES AND WATER-BASE PAINTS AND PROCESS FOR PREPARING THEM

William R. Conn, Perkasie, and Benjamin B. Kine and William C. Prentiss, Levittown, Pa., assignors to Rohm & Haas Company, Philadelphia, Pa., a corporation of Delaware No Drawing. Application May 13, 1953,
Serial No. 354,872

20 Claims. (Cl. 260—29.6)

This invention deals with dispersions of interpolymers in aqueous media from which adhesive and cohesive films may be formed and with such dispersions to which pigments have been added and which are suitable for coatings. With greater particularity this invention deals with film-forming aqueous paint bases and pigmented compositions therefrom in which the film-forming substance is dispersed with a non-ionic emulsifier in an aqueous medium having a pH between 8 and 10, this substance being a water-insoluble interpolymer formed with (A) units having carboxylate groups derived from a polymerizable carboxylic acid having $\alpha,\beta$-unsaturation in a vinylidene group, (B) units from at least one neutral, free radical-polymerizable ester having a vinylidene group attached to the functional group, which ester by itself yields a soft linear polymer, and (C) units from at least one neutral polymerizable monovinylidene compound which by itself yields a hard polymer.

To obtain the interpolymers of the paint base of this invention these three types of units must all be present, these being supplied from corresponding monomers, and being present within proportions which are best defined in terms of their contributions to or functions in the interpolymer. The proportion of carboxylate units must be sufficient to impart stability and viscosity to the aqueous dispersion of interpolymer and also freeze-tolerance. At the same time there must not be so many groups of this type as to impart sensitivity to water for any given interpolymer. The proportion of units from esters which by themselves yield soft polymers must be sufficient to cause the dispersed interpolymer to form a cohesive and adhesive film at the temperature of application. The proportion of units from polymerizable monovinylidene compounds which yield by themselves hard polymers is sufficient to supply toughness to the interpolymer and resistance to swelling in water.

Numerous proposals have been made for preparing so-called emulsion paints. While some of these paints have found relatively wide use, they have nevertheless suffered from deficiencies or disadvantages, which have limited their scope of utility or detracted from the potential value of this type of paint. Typical recent developments in water-base paints have been based on modified styrene. Since polystyrene by itself fails to give continuous films from aqueous dispersions, polymers from styrene have been modified with diolefins, which are, however, poor in resistance to oxidation and thus slowly but surely the resulting copolymers deteriorate. If a plasticizer is added to modify polystyrene, it evaporates, exudes, or migrates to leave the coating in a less desirable state. The previously proposed dispersions of resins have not been freely compatible with pigments. This has considerably limited the choice of possible pigments for practical use and/or has necessitated special steps and additional materials in preparing paints from aqueous dispersions. Resin dispersions and water-base paints have frequently been found corrosive, a highly undesirable characteristic for products normally packaged in metal containers. Previously known dispersions and water-base paints have been deficient in resistance to freezing. Films laid down from these paints have not been readily touched up or suitable for recoating soon after the paint has been applied. Scrub resistance of films from some water-base paints of the art has developed only slowly over a period of two to four weeks. Even then the dried films have not been as readily cleanable as is desired. After consideration of the above and other difficulties or deficiencies it is clear that many improvements are possible and desirable. Lacquers and enamels have been made by dissolving polymers of acrylic and/or methacrylic esters with or without acrylic or methacrylic acid. It has been asserted that the presence of acid groups in an interpolymer promotes gloss through improved dispersion of pigments. But many pigments in some solvent systems will not tolerate even small amounts of acid and in many formulations of enamels livering takes place as the enamels stand. Even when the previously proposed interpolymers were prepared through emulsion technique, the resulting dispersions are deficient in required rheological properties, lack of freeze-tolerance, lack of stability to grinding, mixing, mechanically working or storing, lack of resistance to the effects of added pigments, and lack of stability from the addition or presence of many water-soluble materials, such as calcium salts, casein, or alginates. Furthermore, such interpolymers as are in fact shown in the art for use in lacquers are deficient in the essential properties needed in a water-base paint for use under the practical conditions of application which must be met.

In addition to properties already discussed there are other properties needed for good dispersions of water-base paints and it is desirable that these be developed to the fullest extent. For example, resinous dispersion and paint should be stable to prolonged storage and stable to mechanical working. They should be stable as to pH, viscosity, and the effects of metal surfaces and pigments. Films laid down from the water-base paint should be resistant to solutions of acids, alkalies, and salts. The application properties which are desirable include suitable viscosity for applying, good brushing qualities, and capacity for forming an adhesive film both in wet and dry states, which film binds cohesively a high proportion of pigment. The film must have good continuity and flexibility. It should dry at a relatively rapid rate. It should soon become resistant to swelling or lifting in the presence of cold water. The film should have good color and color retention, possess high resistance to waterborne stains, to oil stains, to ageing, and to wet-scrubbing.

Development of required and desired properties in high degree, it has been found, is attained through the process of this invention. The products of this invention possess these properties in high degree. The process of preparing stable, film-forming, freeze-tolerant aqueous paint bases of this invention comprises emulsifying in balanced proportions (A) a polymerizable $\alpha,\beta$-unsaturated monovinylidene carboxylic acid or a water-soluble salt thereof, (B) at least one neutral monomeric monovinylidene ester which is polymerizable with free radical catalysts and which by itself forms a soft polymer, and (C) at least one neutral monovinylidene monomer which is polymerizable with free radical catalysts and which by itself forms a hard polymer, emulsification being accomplished with a surface-active, water-soluble non-ionic polyethoxyethanol in an aqueous medium, supplying thereto a free radical polymerizing catalyst in a redox system, then polymerizing together said acid or salt, said compound, and said monomer at a temperature below that at which coagulation would occur in the dispersion, whereby a dispersion of a water-insoluble interpolymer is formed in the aqueous medium, and bringing the pH of the dispersion to a value between 8 and 10, such as from 9 to 9.8 and, preferably to a value from 9.3 to 9.6, by adding preferably ammonia, or a water-soluble amine at least in part, or an alkali metal base.

When a water-base paint is to be prepared, the above interpolymer dispersion is mixed with a pigment or mixture of pigments, preferably in the form of an aqueous paste. We have found that dispersions of water-insoluble interpolymers prepared in this way from the stated materials and the water-base paints made therewith are highly stable as to dispersion, pH, and viscosity, are freeze-tolerant, are but little sensitive to ions, and deposit adhesive, cohesive films which rapidly become water-resistant, stain-resistant, and scrub-resistant. The dispersions and paints made therewith have excellent application properties.

As polymerizable α,β-unsaturated monovinylidene carboxylic acids, there are used acrylic acid, methacrylic acid, or other α-substituted polymerizable acrylic acid, or itaconic acid. The preferred acids are methacrylic and then acrylic. In place of the free acids there may be used water-soluble salts thereof, including the ammonium salts and the alkali metal salts such as lithium or potassium carboxylates. The salts may be preformed or they may be formed in the dispersion system. The necessary and important consideration is that carboxylate groups be supplied to enter into the interpolymer. The best way to ensure that carboxylate groups do in fact enter into the copolymer chain is to use an above acid.

The useful monomers which by themselves yield soft polymers are neutral compounds which form a separate phase with the aqueous solutions used in forming the dispersions, which contain per molecule one vinylidene group attached to a functional substituent or an activating substituent with a double bond, which polymerize through the vinylidene group with the aid of a free radical catalyst, and which yield solid polymers having a $T_1$ value below 15°–20° C. The useful monomers which yield hard polymers by themselves are identifiable in the same general terms except they have a $T_1$ value above 15°–20° C.

The $T_1$ value referred to is the transition temperature or inflection temperature which is found by plotting the modulus of rigidity against temperature. A convenient method for determining modulus of rigidity and transition temperature is described by I. Williamson, British Plastics 23, 87–90, 102 (September 1950). The $T_1$ value here used is that determined at 300 kg./cm.$^2$.

As polymerizable, neutral, monomeric monovinylidene esters which form soft, solid polymers in the presence of peroxidic catalysts, there may be used any primary and secondary alkyl acrylate, even with alkyl substituents up to eighteen or more carbon atoms, primary or secondary alkyl methacrylates with alkyl substituents of five to eighteen or more carbon atoms, or other monovinylidene compounds as defined above which are polymerizable below 80° C. with free radical catalysts to form soft solid polymers. Ionically polymerizable compounds are not within the scope of this class of compounds. The preferred monovinylidene compounds are the stated acrylates and methacrylates and of these the most practical esters are those with alkyl groups of not over 12 carbon atoms.

The preferred monomers which by themselves yield soft polymers may be summarized by the formula $$CH_2=C-COOR^x$$
$$\phantom{CH_2=C-}|$$
$$\phantom{CH_2=C-}R$$

where R is hydrogen or the methyl group and $R^x$ represents, when R is methyl, a primary or secondary alkyl group of 5 to 18 carbon atoms, or, when R is hydrogen, an alkyl group of not over 18 carbon atoms, or, better, of two to 12 carbon atoms.

Typical compounds coming within the above definition are methyl acrylate, ethyl acrylate, propyl acrylate, isopropyl acrylate, butyl acrylate, isobutyl acrylate, sec.-butyl acrylate, amyl acrylate, isoamyl acrylate, hexyl acrylate, 2-ethylhexyl acrylate, octyl acrylate, 3,5,5-trimethylhexyl acrylate, decyl acrylate, dodecyl acrylate, cetyl acrylate, octadecyl acrylate, octadecenyl acrylate, n-amyl methacrylate, sec.-amyl methacrylate, hexyl methacrylate, 2-ethylbutyl methacrylate, octyl methacrylate, 3,5,5-trimethylhexyl methacrylate, decyl methacrylate, dodecyl methacrylate, octadecyl methacrylate, butoxyethyl acrylate or methacrylate or other alkoxyethyl acrylate or methacrylate, etc.

As polymerizable monovinylidene monomers which by themselves form hard polymers, there may be used alkyl methacrylates having alkyl groups of not over four carbon atoms, also tert.-amyl methacrylate, tert.-butyl or tert.-amyl acrylate, cyclohexyl acrylate or methacrylate, acrylonitrile, or methacrylonitrile.

The above monomers yield polymers under the influence of free radical catalysts, particularly peroxidic catalysts, which polymers are generally regarded as hard. These polymers, when free of any appreciable content of monomer, have $T_1$ values above about 20° C. Hard polymers have also been defined as those having softening points above 55° C. or brittle points above about 5° C. These are all different appraisals of the force required to produce a given deformation in a body in a given time and to evaluate the aggregation of various properties encompassed within the term of hardness.

Preferred monomers which by themselves form hard polymers may be summarized by the formula $$CH_2=C-X$$
$$\phantom{CH_2=C-}|$$
$$\phantom{CH_2=C-}R$$

wherein R is a hydrogen or the methyl group and wherein X represents one of the groups —CN, and ester-forming groups —COOR′, wherein R′ is cyclohexyl or, when R is hydrogen, a tert.-alkyl group of four to five carbon atoms, or, when R is methyl, an alkyl group of one to four carbon atoms. Some typical examples of these have already been named. Other specific compounds are methyl methacrylate, ethyl methacrylate, propyl methacrylate, isopropyl methacrylate, butyl methacrylate, sec.-butyl methacrylate, and tert.-butyl methacrylate.

In order to prepare interpolymers having the requisite properties there must be used at least one of each of the above three classes of polymerizable materials. The unsaturated carboxylic acid or salt is interpolymerized in a proportion usually between about 0.5% and 2.5% by weight, preferably between 0.8% and 2%, of the interpolymer, the proportion being selected for a given combination of polymerizable materials to provide the properties of stability, viscosity, and freeze-tolerance without development of water-sensitivity.

Useful proportions of monomers characterized by forming soft and hard polymers respectively vary with the choice of these monomers. For this reason the required proportions are best defined functionally. There are considerable variations in softness and hardness produced by different members of the respective classes of polymerizable monomers. Thus, if a monomer is selected which gives a greater degree of softness than another, more of a monomer forming a hard polymer will be used to attain a given level of toughness for the final interpolymer. Conversely, if a monomer yielding a relatively harder and, perhaps, more brittle polymer is selected, then more of a given monomer yielding soft polymers will be used, or a monomer is selected which gives by itself an even softer polymer.

Some typical proportions which provide a desired balance of properties in films of the interpolymers which include 0.5 to 2.5% of a defined acid are as follows, these being by weight: ethyl acrylate-methyl methacrylate, 6:4 to 7:3; ethyl acrylate-styrene, 4:1 to 7:3; ethyl acrylate-acrylonitrile, 4:1 to 3:1; propyl acrylate-acrylonitrile, 7:3 to 3:1; isopropyl acrylate-acrylonotrile, 9:1 to 5:1; isopropyl acrylate-methyl methacrylate, 6:1 to 4:1; propyl acrylate-methyl methacrylate, 1:1 to 2:3; butyl acrylate-acrylonitrile, 7:3 to 3:2; butyl acrylate-methyl methacrylate, about 1:1; isobutyl acrylate-acrylonitrile, 4:1 to 7:3; isobutyl acrylate-methyl methacrylate, 3:2 to 1:1; sec.-butyl acrylate-acrylonitrile, 5:1 to 4:1; sec.-butyl acrylate-methyl methacrylate, 7:3 to 3:2; 2-ethylhexyl acrylate-styrene, 1:1 to 2:3; 2-ethylhexyl acrylate-acrylonitrile, 2:1 to 3:2; 2-ethylhexyl acrylate-methyl methacrylate, 1:1 to 2:3; 2-ethylhexyl acrylate-butyl methacrylate, 1:9 to 1:20; 2-ethylhexyl acrylate-isobutyl methacrylate, 3:7 to 1:4; ethyl acrylate-tert.-butyl methacrylate, 9:1 to 5:1; dodecyl acrylate-methyl methacrylate, 2:3 to 1:3; hexyl methacrylate-butyl methacrylate, 1:1, etc. It will be seen that to provide useful interpolymers the outside proportions of monomers forming soft polymers to monomers forming hard polymers vary from about 9:1 to about 1:20. In every case, of course, the ultimate interpolymer will be formed with about 0.5% to about 2.5% of a defined carboxylate. For the preferred situation in which the interpolymer is prepared from an ester of acrylic acid and a non-tertiary alkanol of not over 12 carbon atoms and methyl methacrylate (together with acid), the ratios vary from about 6:1 to 1:3. These ratios are also preferred for other acrylic materials.

The emulsifiers which have been found needed to disperse or emulsify the present combinations of monomers and to maintain the formed intorpolymers in stable suspension or non-ionic surface active agents. These are composed of a hydrophobic or hydrocarbon portion and a hydrophilic portion. The latter is a polyether chain usually terminated with an alcoholic hydroxyl group. This is of sufficient size to render the agents water-soluble. For combinations of monomers in which polar groups form a relatively good proportion it is preferred that the non-ionic agents have 20 to 50 ether groups in the hydrophilic portion. When the combination of polymerizable monomers has a relatively high hydrocarbon content, best results are usually had with non-ionic agents having a relatively small proportion of ether groups. These principles will guide the selection of the most effective emulsifiers for the particular monomers chosen for the preparation of suspensions of resulting interpolymers.

Typical emulsifiers which may be used include alkylphenoxypolyethoxyethanols having alkyl groups of about seven to twelve carbon atoms, such as heptylphenoxypolyethoxyethanols, octylphenoxypolyethoxyethanols, methyloctylphenoxypolyethoxyethanols, nonylphenoxypolyethoxyethanols, dodecylphenoxypolyethoxyethanols, and the like; polyethoxyethanol derivatives of methylene linked alkyl phenols; sulfur-containing agents such as those made by condensing the required proportion of ethylene oxide with nonyl, dodecyl, tetradecyl, and the like mercaptans or with alkylthiophenols having alkyl groups of six to fifteen carbon atoms; ethylene oxide derivatives of long-chained carboxylic acids, such as lauric, myristic,. palmitic, oleic, and the like or mixtures of acids such as found in tall oil; ethylene oxide condensates of long-chained alcohols, such as octyl, decyl, lauryl, or cetyl alcohols, ethylene oxide derivatives of etherified or esterified polyhydroxy compounds having a hydrophobic hydrocarbon chain, etc.

The amounts of emulsifier or emulsifiers required vary primarily with the concentration of monomers to be handled and to a minor extent with choice of emulsifier, monomers, and proportions of monomer. Generally, the amount of emulsifying agent is between 2% and 12% of the weight of the mixture of monomers and is preferably 4% to 7% of this weight. If the dispersion is to contain a relatively low concentration of interpolymer somewhat more than the minimum emulsifying agent indicated by the above rule may prove desirable. In such case the concentration of emulsifying agent in the aqueous solution may desirably be at least 1% of this solution and may be as much as about 7% of the weight of the aqueous solution thereof.

As polymerization catalyst there may be used one or more peroxides which are known to act as free radical catalysts and which have solubility in aqueous solutions of the emulsifier. Highly convenient are the persulfates, including ammonium, sodium and potassium persulfates or hydrogen peroxide or the perborates or percarbonates. But there may also be used organic peroxides, either alone or in addition to an inorganic peroxidic compound. Typical organic peroxides include benzoyl peroxide, tert.-butyl hydroperoxide, cumene peroxide, tetralin peroxide, acetyl peroxide, caproyl peroxide, tert.-butyl perbenzoate, tert.-butyl diperphthalate, methyl ethyl ketone peroxide, etc. The preferred organic peroxides have at least partial solubility in the aqueous medium containing the emulsifying agent. Choice of inorganic or organic peroxidic catalyst depends in part upon the particular combination of monomers to be interpolymerized, some of these responding better to one type than the other.

The amount of peroxidic catalyst required is roughly proportional to the concentration of the mixture of monomers. The usual range is 0.01% to 3% of catalyst with reference to the weight of the monomer mixture. The preferred range is from 0.05% to 0.5%, while the range of 0.1% to 0.25% is usually best. The optimum amount of catalyst is determined in large part by the nature of the particular monomers selected, including impurities which accompany particular monomers.

In order to effect interpolymerization at a temperature below that at which coagulation might occur, it is desirable to activate the catalyst. This may best be accomplished by using a so-called redox system in which a reducing agent is present in addition to the peroxidic catalyst. Many examples of such systems are known. Agents such as hydrazine or a soluble sulfite, including hydrosulfites, sulfoxalates, thiosulfates, sulfites, and bisulfites can be used. Examples of these are sodium hydrosulfite, sodium metabisulfite, potassium sulfite, zinc formaldehyde-sulfoxalate, and calcium bisulfite. Redox systems may be activated by the presence of a small amount of polyvalent metal ions. Ferrous ions are commonly and effectively thus used, a few parts per million being sufficient. The peroxidic catalyst may also be activated by the presence of a tertiary amine which is soluble in the reaction medium, such as dimethylethanolamine or triethanolamine.

The amounts of reducing agent or amine required vary somewhat with the choices of peroxide initiator, reducing activator or agents, and metal promotor, if used, also with the choice of emulsifying agent, and with the particular monomers involved. Yet within the limits of about 0.05% to 6% with reference to the weight of the mixture of monomers will be found the amount of reducing agent for practically any system. The preferred amounts of sulfite agent or equivalent fall in the range of 0.2% to 1%.

Copolymerization is best effected below about 80° C. A preferred range is 15° to 70° C., although slightly lower and somewhat higher temperatures are permissible. After most of the monomers have been converted to interpolymer, temperatures even higher than 80° C. may then be applied. In fact after most of the monomers have interpolymerized, the resulting dispersion can be heated to boiling without breaking the dispersion. During interpolymerization the temperature can be controlled in part through the rate at which monomers are supplied and interpolymerized and/or through applied cooling.

The polymerization process can be carried out batchwise or continuously. It is possible to work entirely batchwise, emulsifying the entire charge of monomers and proceeding with polymerization. It is usually advantageous, however, to start with part of the monomers which are to be used and add more monomer or monomers as polymerization proceeds. An advantage of gradual addition of monomers lies in reaching a high solids content with optimum control and with maximum uniformity of product. Additional catalyst or additional components of the redox system may also be added as polymerization proceeds.

In the process of polymerization here described an aqueous emulsion of a mixture of the defined polymerizable monomers is stirred and treated with a redox system starting between about 10° C. and about 40° C. About 0.01% to 1% of a peroxidic catalyst based on the weight of the monomers used is usually an effective amount at the start and the required amount of reducing substance, hydrosulfite, sulfite metabisulfite, or the equivalent for this system, may be of the same order or somewhat more by weight. When interpolymerization starts, the temperature of the mixture rises, usually rather rapidly. Care is taken to keep the temperature of the mixture below the levels at which coagulation might occur.

Amounts of monomers are supplied to bring the content of dispersed interpolymer to 25% to 60% of the total dispersion, preferably to 45% to 55%. Interpolymerization or copolymerization should be carried on until no more than a few percent of monomers remain in the mixture. When these monomers are volatile, they can be reduced or removed by steam distillation or stripping under reduced pressure, if so desired.

With the attainment of desired interpolymer content in good yield, with or without removal of residual monomers, the dispersion is cooled, cooling to a range of 50° to 20° C. being generally satisfactory. The dispersion is then rendered mildly alkaline by adding ammonia or a water-soluble amine, or an inorganic base, such as potassium hydroxide, or a mixture thereof. As organic bases there may be used morpholine, piperidine, pyrrolidine, triethanolamine, dimethylethanolamine, ethanolamine, propanolamine, diethanolamine, or the like, particularly amines of molecular weights not over 150. A combination of an organic base and ammonia is often particularly useful. Ammonia, usually giving the best results in the simplest way, is preferred.

In some instances it may be desired at this point to make a final adjustment of the viscosity of the alkaline suspension as by adding a small amount of a thickening agent, such as sodium alginate, sodium or ammonium polyacrylate, methylcellulose, or the like. In this way compensation may be made for possible minor variations from batch to batch of dispersions.

Additional details of preparation of emulsions are supplied in the following illustrative examples.

*Example 1*

A solution is prepared of 25 parts of an octylphenoxypolyethoxyethanol having about 30 ether groups in 1000 parts of water. There are mixed 280 parts of ethyl acrylate, 140 parts of methyl methacrylate, and 5.5 parts of methacrylic acid. This mixture is added with stirring to the solution. The resulting mixture is cooled to 15° C. A solution of 0.5 part of ammonium persulfate in 1.5 parts of water is then added, followed by addition of a solution of 0.6 part of sodium hydrosulfite in six parts of water. Stirring is continued. In a few minutes the temperature of the mixture begins to rise and continues to rise, reaching about 65° C. in a half hour. After five minutes the mixture is cooled to about 15° C. There are now added 35 parts of the same octylphenoxypolyethoxyethanol, 315 parts of ethyl acrylate, 155 parts of methyl methacrylate, 6 parts of methacrylic acid, a solution of 0.6 part of ammonium persulfate in 1.5 parts of water, and 0.8 part of sodium hydrosulfite in six parts of water. In a short time the temperature of the mixture rises, a maximum of about 65° C. again being reached. Stirring is continued for an hour and then while the batch is cooled to 30° C., ammonium hydroxide solution is added until a pH of 9.5 is reached. The resulting product is a dispersion of an interpolymer of ethyl acrylate, methyl methacrylate, and methacrylic acid in over a 99% yield.

This dispersion is highly resistant to breakage on freezing, as shown by a test in which the dispersion is repeatedly carried to —15° C. and thawed at room temperature for at least five cycles. The dispersion resists breakage when stirred or otherwise agitated. It resists breakage when passed through the rolls of a paint mill. Pigments can be ground directly into this dispersion whether ground on a ball mill or on a colloid mill. The dispersion is not broken when one volume of this dispersion is mixed with one volume of a 10% calcium chloride solution.

In place of the methyl methacrylate used above there may be used a mixture of methyl methacrylate and tert.-butyl methacrylate.

*Example 2*

A solution is prepared from 30 parts of a octylphenoxypolyethoxyethanol having about 45 ether groups in 1000 parts of water. To this are added with stirring 260 parts of ethyl acrylate and 155 parts of methyl methacrylate. The reaction vessel is now flooded with nitrogen. There are added 0.5 part of ammonium persulfate and 0.7 part of sodium hydrosulfite. A solution is prepared from four parts of glacial acrylic acid in 56 parts of water and this is added in small increments while the temperature rises 40° C. Stirring is continued for an hour at elevated temperature. The batch is then cooled to 20° C. There are added 30 parts of the same non-ionic compound, 300 parts of ethyl acrylate, 175 of methyl methacrylate, 0.6 part of ammonium persulfate, and 0.8 part of sodium hydrosulfite. The temperature starts to rise again. A solution of five parts of glacial acrylic acid in 65 parts of water is slowly and continuously added until the temperature rises to 60° C. The temperature continues to rise to 70° C. The batch is then cooled to 20° C. and treated with ammonia to a pH of 9.5. The product is a stable dispersion of interpolymer in a yield of 99%.

In place of the individual acrylate and methacrylate used above there may be used mixtures of various acrylates and/or methacrylates giving soft polymers and mixtures of the various methacrylates giving hard polymers.

*Example 3*

A solution of 10 parts of nonylphenoxypolyethoxyethanol with about 50 ether groups and 15 parts of methylene bis(diamylphenoxypolyethoxyethanol) having about 40 total ether groups in 1000 parts of water is prepared and the solution is cooled to about 15° C. To this are added with stirring 260 parts of ethyl acrylate, 155 parts of methyl methacrylate, and 6.5 parts of glacial methacrylic acid. There are then stirred in 0.7 part of sodium hydrosulfite and 0.6 part of potassium persulfate, followed by 0.006 part of ferrous sulfate crystals. Polymerization starts in a few moments and the temperature rises to about 65° C. The dispersion is then treated with 0.6 part of tert.-butyl hydroperoxide. After about a half hour the dispersion is cooled to 45° C. and treated with ammonia until a pH of 9.3 is attained. The product is a stable dispersion of interpolymer. It is freeze-tolerant, stable to mechanical working, highly resistant to solutions of electrolytes, and compatible with a great variety of paint pigments, as are the other dispersions herein described.

*Example 4*

A solution of 25 parts of octylphenoxypolyethoxyethanol in 1000 parts of water is prepared. Thereto are added 260 parts of ethylacrylate, 155 parts of methyl methacrylate, and 4 parts of itaconic acid. There is added with stirring a solution of 0.5 part of ammonium persulfate in 1.5 parts of water and a solution of 0.7 part of sodium hydrosulfite in 6 parts of water. Temperature soon begins to rise, a maximum of about 68° C. being reached. The dispersion thus formed is stripped practically free of residual monomer by maintaining it at about 68°–65° C. at reduced pressures. The dispersion is cooled to about 40° C. and the pH is brought to 9.5 with a stream of gaseous ammonia. A stable dispersion of interpolymer is thus obtained.

*Example 5*

The procedure of Example 4 is repeated with substitution for the itaconic acid of a mixture of 2.5 parts of acrylic acid and 4 parts of methacrylic acid. A stable dispersion of interpolymer is likewise obtained.

*Example 6*

A solution is prepared from 25 parts of diamylphenoxypolyethoxyethanol having about 25 ether groups in 1000 parts of water. The solution is cooled to 13° C. The vessel is flushed with nitrogen. There are added with stirring 260 parts of ethyl acrylate, 155 parts of methyl methacrylate, and 6.5 parts of methacrylic acid (100%). There are added 0.5 part of ammonium persulfate, then one part of sodium metabisulfite, and 0.006 part of ferrous sulfate. In about 10 to 20 minutes the temperature of the mixture begins to rise. When 60° C. is reached a charge of 0.3 part of tert.-butyl perbenzoate is slowly added. The temperature continues to rise to about 70° C. and remains at this level for 20 minutes until reduced pressure is applied. The batch is cooled under reduced pressure. At 30° C. cooling is discontinued. Morpholine is added to a pH of 7.5 and ammonia is added to bring the pH to 9. A stable dispersion of interpolymer is thus produced.

*Example 7*

The procedure of Example 6 is followed up to the point at which tert.-butyl perbenzoate is added. At this point the batch is cooled to about 20° C. There are added 30 parts of the same emulsifier, 0.5 part of sodium bisulfite, and 0.5 part of sodium hydrosulfite, each of these having been first taken up in a small amount of water. There is prepared a mixture of 300 parts of ethyl acrylate, 175 parts of methyl methacrylate, and 4.8 parts of acrylic acid. About one quarter of this mixture is added at once to the stirred dispersion. There is prepared a solution of 0.6 part of ammonium persulfate in 6 parts of water. About a quarter of this is now added. Temperature soon begins to rise. Beginning at about 25° C. the remainder of the monomer is added over a temperature interval of 25° C. At the same time proportionate amounts of the remaining persulfate solution are added. The final temperature is about 70° C. About one part of tert.-butyl hydroperoxide is added to ensure completion of polymerization. The batch is cooled to 25° C. and treated with ammonium hydroxide solution to a pH of 8. A 5% solution of potassium hydroxide is added until the pH becomes 9.5. A stable aqueous dispersion of excellent properties is obtained.

In place of the particular comonomers shown in the above examples by way of illustration there may be other combinations of monomers which by themselves give soft polymers and monomers which by themselves yield hard polymers, always modified with sufficient of a vinylidene carboxylic acid to provide viscosity, freeze-tolerance, and stability. Many typical combinations are shown above. These are emulsified along with 0.5% to 2.5% of a defined acid and interpolymerization is effected as above. The dispersed interpolymer which results is neutralized and the dispersion made alkaline, best with ammonia or with a water-soluble amine. Making the dispersions definitely alkaline is a critical part of the process.

*Example 8*

Interpolymerization with other comonomers than those used in Examples 1 to 7 is carried on in the same way. For instance, to a solution of an octylphenoxypolyethoxyethanol (25 parts) in 1000 parts of water there are added with stirring 378.25 parts of methyl acrylate, 42.5 parts of acrylonitrile, and 4.25 parts of methacrylic acid. The mixture is cooled to 18° C. and treated with 0.8 part of ammonium persulfate in a minimum amount of water to cause solution and then with 0.9 part of sodium hydrosulfite. In a short time reaction begins as shown by a gradual rise of temperature to about 69° C. The mixture is cooled to 15°–20° C. Addition is made of 35 parts of the same emulsifier, a mixture of 423.7 parts of methyl acrylate and 47.6 parts of acrylonitrile, and 0.5 part of ammonium persulfate in 1.5 parts of water. As reaction begins again 4.8 parts of methacrylic acid are slowly added. The temperature reaches 67° C. Stirring is continued while 0.1 part of tert.-butyl hydroperoxide is added. The temperature is maintained at 65°–70° C. for an hour. The batch is cooled below 50° C. and treated with ammonia until it has a pH of 9.6. A highly useful dispersion of interpolymer is thus obtained, suitable for use as a sealer, and binder, particularly in coating compositions.

*Example 9*

A solution is prepared from 16 parts of an octylphenoxypolyethoxyethanol having about 11 ether groups, six parts of a water soluble non-ionic emulsifier prepared from the resinous condensate of diisobutylphenol and formaldehyde by reaction with ethylene oxide, and 969 parts of water. There is added thereto with stirring a mixture of 140 parts of dodecyl methacrylate, 280 parts of methyl methacrylate, and five parts of methacrylic acid. The resulting emulsion is blanketed with nitrogen and treated with a solution of 0.5 part of ammonium persulfate in 1.5 parts of water followed by addition of 0.6 part of sodium hydrosulfite in six parts of water. The temperature of the mixture rises slowly and is maintained at about 70° C. for two hours. An additional charge of 0.1 part of ammonium persulfate in water is made. The batch is cooled below 40° C. and treated with ammonia gas to a pH of 9.6 to give a stable dispersion useful in coatings applications.

The dispersions based on methacrylic esters or acrylonitrile and methacrylonitrile and acrylic esters or methacrylic esters which form soft polymers together with acrylic or methacrylic acid in limited amount are peculiarly advantageous. The dispersions of interpolymers are relatively free of objectionable odor. They are very stable on storage. They give adhesive and cohesive films of excellent color and color-retention. The films do not tend to craze or crack or to discolor.

*Example 10*

A solution is prepared from 466 parts of water and 18.1 parts of an aqueous 70% solution of tert.-octylphenoxypolyethoxyethanol having about 40 ether groups. Thereto are added with stirring 139 parts of ethyl acrylate, 69 parts of methyl methacrylate, and 7.5 parts of ammonium methacrylate in aqueous solution of pH 6.5. The temperature of the resulting emulsion is reduced to about 15° C. Thereupon 0.25 part of ammonium persulfate and 0.14 part of sodium hydrosulfite are added, followed by two 0.10 part portions of this hydrosulfite. The reaction then begins with the temperature of the batch rising 53° C. in about 27 minutes. The batch is cooled to about 20° C. There is added a portion of 20.2 parts of the same emulsifier. Addition is then made of 76 parts of methyl methacrylate, 158 parts of ethyl acrylate, 8.6 parts of ammonium methacrylate in aqueous solution of pH 6.5, and 700 parts of water, followed by 0.29 part of ammonium persulfate. Several successive additions of sodium hydrosulfite are made, totaling 0.38 part. The polymerization reaction begins, but is not rapid, the maximum temperature being 58° C. The pH of the reaction mixture is adjusted to a value of 5 by addition of acetic acid and addition of activator is made. The batch is brought to 25° C. and treated with ammonium hydroxide solution to a pH of 9.5.

Example 11

The procedure of Example 10 is followed, except that the ammonium persulfate is replaced with 0.52 part of (60%) tert.-butyl hydroperoxide in the first part of the reaction, the temperature rising to 72° C., and 1.5 parts of tert.-butyl hydroperoxide in the second part, the temperature rising to 64° C. After completion of the reaction the dispersion is cooled and brought to a pH of 9.6 with ammonia.

When ammonium salts are used, it is better to use an organic peroxide as catalyst.

Example 12

The procedure of Example 10 is followed, utilizing the same weights of emulsifier, methyl methacrylate, ethyl acrylate, and water. In place of ammonium methacrylate there is added 2.7 parts of methacrylic acid in the first stage. The emulsion is then treated with 7.1 parts of a 25% solution of potassium hydroxide. Ammonium persulfate and sodium hydrosulfite are added as before, but 1.3 parts of 60% tert.-butyl hydroperoxide are added as the reaction proceeds. During the second stage there is used 4.5 parts of potassium methacrylate in aqueous solution in place of the ammonium salt and several additions of tert.-butyl hydroperoxide are made for a total of two parts, additional hydrosulfite also being used. The dispersion thus prepared is cooled and adjusted to pH 9.5 with ammonium hydroxide.

Example 13

There are mixed 93.2 parts of methyl methacrylate, 24.4 parts of aqueous 70% octylphenoxypolyethoxyethanol with about 35 ether groups, and 629 parts of water. While this mixture is stirred, there is added 12 parts of aqueous 25% potassium hydroxide solution. The mixture is stirred for five minutes while 1.3% of the methacrylate is saponified. To this are added 188 parts of ethyl acrylate, 0.456 part of sodium hydrosulfite, and aqueous ferrous sulfate to supply 3 p. p. m. of iron. The mixture is cooled to 15° C. and tert.-butyl hydroperoxide (60%) is gradually added to a total of four parts. The temperature of the batch reaches 70° C. When reaction has abated, the batch is cooled.

A separate mixture is made of 21.6 parts of the same emulsifier, 37 parts of water, 105 parts of methyl methacrylate, and 13.5 parts of 25% potassium hydroxide solution. The pH of this mixture drops to a value of 8. It is then poured into the above dispersion and 212 parts of ethyl acrylate are added, followed by 0.55 part of sodium hydrosulfite and an additional 3 p. p. m. of iron as ferrous sulfate. Catalyst is then slowly dropped in to a total of 2.9 parts. The temperature rises to 63° C. About 800 parts by volume of the resulting dispersion of interpolymer is treated with one volume of concentrated ammonium hydroxide. The pH of the suspension is then 10. It contains 46.7% solids, corresponding to a yield of interpolymer of 96.8%.

Any of the above dispersions can be used for sealing fibrous materials, joining sheets together as quick-tack adhesives, for priming surfaces, and for coatings where unpigmented films are desired. These dispersions are also useful as binders for pigments, providing useful aqueous resin bases for water-base paints, inks, sealers, and the like.

A great variety of pigments may be used for preparing these coating compositions. Colors belonging both to the inorganic class and to the organic class may be selected. Extenders such as clay, silica, talc, mica, calcium carbonate, barium sulfate, or calcium silicate, may be incorporated.

Various auxiliary materials may also be used in preparing the water-base paints. These include dispersing agents for dispersing and maintaining in a finely divided state pigments, colors, or extenders, such as aromatic sulfonates condensed with formaldehyde or any of the suitable commercial dispersing agents which are available for this purpose; sequestering agents for controlling polyvalent metal ions sometimes introduced by pigments, colors, or extenders, such as complex alkali metal phosphates or ethylene polyaminoacetates; defoaming agents, including waxes, oils, or mineral spirits, or an alkylphenoxyethanol, fatty acid amides, often from a polyamine, phosphate esters, or a solution of an amine or amide in an oil; humectants, such as water-soluble gums, ammonium or sodium polyacrylate, glycol laurate, propylene glycol, diethylene glycol, etc.; thickeners, such as water-soluble gums, water-soluble polyacrylates and methacrylates, water-dispersed starches and proteins, etc.; bactericides and/or fungicides, such as borax, pentachlorophenols, or mercury compounds; perfume-like materials, including neutralizing and masking agents, which are used to overcome odors or to impart pleasant and distinctive odors; other resinous materials in dispersed form, such as alkyd resins, drying oils, or latices of styrene or of styrene and butadiene to cheapen and extend the binders of this invention, eac.

The following materials have been studied in paint formulations and found to provide paints based on the dispersions of this invention which remain stable during storage at 140° F. for 40 hours and for at least five cycles wherein the paint is held alternately at 5° F. for 24 hours and thawed at room temperature: clays, talc, calcium carbonate, barium sulfate, various grades of lithopone, titanium dioxide pigments particularly of the chalking type and of the type having a high water demand for making aqueous pastes, carbon blacks, iron oxide black, iron oxide yellow, red iron oxides, both the 72–76% grade and the 96–98% grade, cadmium red, toluidene red, alizarine red, chrome oxide, pigment green B, phthalocyanine green, phthalocyanine blue, ultramarine blue, Hansa yellows, cadmium yellow, and the like.

While it is possible to mix pigments and an aqueous dispersion of this invention and to grind the mixture, as on a three roll mill or in a colloid mill, it is generally better to prepare a paste of pigment or color in water, particularly with the aid of a dispersing agent and to combine such pastes with a dispersion of interpolymer.

In the preparation of such pastes, water, pigment, and dispersing agent are best mixed. The mixture is then ground on a pebble mill, roll mill, colloid mill, or high speed stone mill, or in some instances in a high shear mixer. Consistency of paste is controlled by the dispersing agent and the amount of water used. Sometimes vehicle (dispersion of interpolymer) may be added to the pigment paste to be ground. Where foaming may occur, however, this practice is not recommended.

Colors may be treated in the same way as white pigments and extenders or they may be ground in the presence of the other pigments and extenders used in a formulation.

The pigments may constitute only 5% to 10% of the total solids in a coating composition, particularly when a gloss finish is desired. For semi-gloss to flat paints the pigment to binder ratio may vary from about 1:2 to 3:1 or more. A paint with an 8:1 or 12:1 pigment to binder ratio makes an excellent sealer or topcoat. This ratio may be carried to 20:1 or even more for special coatings applications. Thus, broadly 1:20 to 20:1 ratios are generally useful, but not entirely limiting, since clear films may be used on the one hand and even pigment to binder ratios up to 30:1 have been proved desirable in special applications, such as paper coating.

Some typical formulations of pigmented compositions follow.

Example 14

There are mixed and ground on a roller mill 266.2 parts of titanium dioxide, 76.0 parts of lithopone, 51.5 parts of mica, 80.7 parts of silica, 6.8 parts of the formaldehyde-condensed sodium naphthalene sulfonate, 7.2 parts of diethylene glycol, and 189.5 parts of water. When this mixture has been ground to a smooth, uniform paste, it is mixed with 516.0 parts of a dispersion of interpolymer, which contains 46% solids and which has been prepared as in Example 1. When the parts used are pounds, this formula yields 100 gallons of a white flat paint. It weighs 11.96 pounds per gallon, contains 59.6% of non-volatile matter, has a pigment to binder ratio of 2:1, and has a pigment volume concentration of 36%.

This paint is characterized by being tolerant to freezing, being stable on mechanical working, on prolonged storage, and against traces of iron which are encountered from imperfections in the lining of paint cans, and being readily applied by brush or roller. It may also be applied by knifing, dipping, or spraying. There is no objectionable odor. The applied coatings dry rapidly. They permit recoating almost immediately after drying. The paint films have excellent adhesion, rapidly become scrub-resistant and cleanable, and retain their color.

Example 15

A paint very similar to the above is prepared by dissolving 6.8 parts of the above-used dispersing agent in 189.5 parts of water and adding 7.2 parts of diethylene glycol. There are then added to this solution with stirring 267.0 parts of a titanium white, 76.1 parts of lithopone, 51.9 parts of mica, and 79.0 parts of clay. The resulting slurry is passed into a pebble mill and ground for two hours. The resulting paste is thoroughly mixed with 518 parts of a dispersion of interpolymer prepared as in Example 2 and treated with a little concentrated ammonia to bring the pH of the mixture to a value of 9.5. This paint has the same properties as that described in Example 14.

Example 16

The same procedure is followed with a mixture of 6.8 parts of condensed naphthalene sulfonate, 7.2 parts of diethylene glycol, 266.2 parts of a titanium dioxide pigment, 76.0 parts of lithopone, 51.5 parts of mica, 80.7 parts of talc, and 189.5 parts of water. To this pigment paste is added a dispersion prepared as in Example 1 to a total of 516.0 parts. A paint having properties like those of the two previous examples results.

Example 17

A paste is similarly prepared from 0.9 part of a lignin sulfonate dispersing agent, 1.2 parts of a commercial defoamer which contains a long-chain amide dissolved in a mineral oil, 7.0 parts of diethylene glycol, 25.0 parts of a titanium white, 125.0 parts of lithopone, 212.5 parts of calcium carbonate, 50.0 parts of talc, and 166.0 parts of water. To the resulting paste are added with mixing 481.6 parts of a dispersion like that used in the previous example and 86.8 parts of blue color paste. The blue color paste is prepared by grinding 100 parts of phthalocyanine blue in 600 parts of the same lot of dispersion of interpolymer and passing the mixture through a roller mill.

The blue paint thus formed has excellent application properties and gives a long-lasting film of high color retention.

Example 18

In a similar way a water-base paint is prepared from 0.9 part of a water-soluble sulfonated polystyrene dispersing agent, 1.2 parts of an oil as defoamer, 7.0 parts of diethylene glycol, 166.0 parts of water, 50.0 parts of talc, 150.0 parts of calcium carbonate, and 250.0 parts of lithopone. The resulting paste is mixed with 475.0 parts of a dispersion of interpolymer prepared as in Example 3, followed by 94.5 parts of the color paste used in the previous example. The resulting paint weighs almost 12 pounds per gallon and contains 60% of non-volatile material. It has excellent application properties and gives adhesive films which have a long life, holding its color, and retaining a smooth, even surface.

Example 19

A green color paste is prepared by grinding 100 parts of pigment green B in 600 parts of a vehicle containing 46% of an interpolymer prepared as in Example 1. A pigment paste is prepared by grinding together 250 parts of lithopone, 150 parts of calcium carbonate, 50 parts of talc, 1.2 parts of a defoamer based on an alkylphenoxyethanol, 7.0 parts of dipropylene glycol, 0.9 part of formaldehyde-condensed sodium naphthalene sulfonate, and 166 parts of water. The paste is mixed with 475 parts of a dispersion of interpolymer prepared as in Example 6 and adjusted to 46% solids content. To the mixture is added green color paste in an amount of 94.5 parts. A very satisfactory colored paint results.

In place of the above-used dispersion of interpolymer there may be substituted the dispersions prepared in Example 8 or Example 9. In both cases excellent water-base paints are obtained.

Example 20

A paste is prepared by grinding together 25 parts of titanium dioxide, 125 parts of lithopone, 212.5 parts of calcium carbonate, 50 parts of talc, 1.2 parts of a commercial defoamer, 7.0 parts of diethylene glycol, 0.9 part of formaldehyde-condensed sodium naphthalene sulfonate, and 166 parts of water. There are mixed with this paste 481.6 parts of a dispersion of interpolymer prepared as in Example 4 and 86.8 parts of the green color paste used in the previous example. The resulting paint weighs 11.56 pounds per gallon. It has excellent application properties and gives smooth films having a long life.

In the same way other pigmented coating compositions are prepared. The compositions are useful not only in the field of paints but also in many other fields. For example, pigmented compositions may be applied to paper to provide coated products of various types. Grease-proof papers may be so prepared. Again, compositions prepared as in Examples 14 to 16 may be modified with additional pigments and extenders, ratios of 4:1 to 30:1 of pigment to binder being best for coating of paper. The coated papers may be given a high gloss by a mild buffing.

Other interesting applications of the dispersions of interpolymers of this invention include their use as quick-tack adhesives, particularly for paper and cardboard, their use as additives for increasing the viscosity of solutions of urea-formaldehyde or melamine-formaldehyde condensates, or their use for sealing, priming, or coating leather. The dispersions may be added to textile finishing baths to improve the bulk, drape, and handle of textile fabrics. They may also be used to improve the abrasion resistance of fabrics and to decrease the lint available therefrom. They are also valuable for preparing pastes for the printing of textiles such as canvas.

Similar compositions are desirable as sealers on felts. They can be applied to cement, stucco, concrete and other porous bodies to seal pores and prevent dusting and flaking.

The dispersions of this invention are also highly effective vehicles for preparing printing inks for aniline type presses. Here a pigment to binder ratio of 1:20 to 2:1 proves useful. Pigment may be milled directly with vehicle or there may be made a paste concentrate which is diluted with vehicle and/or water usually to a 5% to 25% pigment concentration.

Example 21

There is dissolved in 502 parts of water nine parts of a partially desulfonated sodium lignin sulfonate and 91 parts of an ink grade carbon black is added thereto. The resulting mixture is ground in a pebble mill for two hours. The paste may, if desired, be treated with a small amount of a defoaming agent such as a solution of aluminum stearate in pine oil. There is then mixed with this color paste 397 parts of a dispersion of one of the interpolymers from any of the above examples. Milling is continued for two hours. There results an effective printing ink giving a dense black with a semi-gloss even on highly absorptive corrugated box stocks. This ink sets within five seconds and dries within five minutes. It is then highly resistant to water.

*Example 22*

As a different formulation for printing inks, there may be cited one made with 233 parts of barium lithol, 506 parts of the dispersion of interpolymer of Example 3 and 261 parts of water. This mixture is ground in a pebble mill for four hours. The resulting composition is a useful red ink with a strong bluish understone and a bronzy toptone. It sets in five seconds after being applied from an aniline press and dries within five minutes.

The properties of the dispersions of interpolymers prepared according to this invention are peculiarly advantageous. They make possible the variety of uses which have been discussed. These properties depend upon the particular type of dispersion here described and upon the composition of the dispersion.

The non-ionic emulsifiers play an important role in contributing to the stability of the copolymer dispersions and pigmented compositions prepared therefrom. The dispersions are stable against mechanical working, shipping, shaking, and storage, against added materials such as pigments, water-soluble gums, and polyvalent ions, against ageing, even in the presence of can surfaces with their usual imperfections, and against the usual effects of freezing or heating. Tolerance to freezing, however, is particularly dependent on the presence in the macromolecules of the occasional carboxylate groups and also on the alkalinity of the aqueous system.

These features of the dispersions also contribute to the viscosity of the dispersions of copolymers and the pigmented dispersions and their excellent application and working properties. There is definite interconnection of these desirable attributes and "built-in" carboxylate groups, alkalinity, and type of emulsifier.

Yet these factors cannot be considered apart from the film-forming combination of units from monomers which would by themselves form soft polymers and from monomers which by themselves form hard polymers. The balanced combination of units from these two kinds of monomers together with the required carboxylate units is responsible for adhesion and cohesion of films. The balance can be adjusted to give copolymers for use over a wide range of application temperatures. While the usual balance will be struck to permit film-formation at temperatures between 20° and 35° C., the use of a larger proportion of the monomer forming soft polymers will permit lower application temperatures with formation of an adhesive, cohesive film. On the other hand, where application temperatures are higher, more of the monomer forming hard polymers may enter into the copolymer.

Films formed from the usual pigmented dispersions of this invention possess excellent resistance to wet-scrubbing. For appraisal of this property films may be cast on sand-blasted glass plates, a thickness of 0.001 to 0.0013 inch being suitable. The films are dried at 75°–80° F. for 24 hours. They are then examined by scrubbing in a Gardner straight line washability machine with a hogbristle brush weighted to one pound. There is used per test a 5 cc. portion of a mixture of equal parts of an abrasive household cleaner (such as "Old Dutch") and a 1% mild soap solution (such as "Ivory" soap). The dried film should be intact after 300 cycles and preferably 500 cycles.

Films from the water-base paints as prepared above have been exposed in a Fadeometer for over 2000 hours without discoloration, crazing, or loss of adhesion. Films have also been stored in an oven at 140° F. for over 1000 hours without evident deterioration, including discoloration and crazing. Films on various kinds of panels, including asbestos shingles and pine wood, have been exposed outdoors for over six months without cracking or peeling.

Paints prepared as above described have advantages of simplicity of preparation and ease of formulation without the necessity of protective colloids or putrefactive additives. There is thus no need for sterilization of equipment or addition of powerful bactericides or fungicides. The copolymer dispersion and coating compositions therefrom have wide tolerance for many kinds of pigments, fillers, and colors, compatibility with other film-forming agents, excellent stability against mechanical action and freezing, excellent chemical stability, high resistance to the action of soluble salts including those encountered in hard waters, pigments, plaster, etc., low odor, and good application properties. The films dry rapidly, yet with good flow and leveling, have excellent color retention and long life, are readily and safely cleaned, and permit repainting with the same or other type of coating composition.

We claim:

1. A freeze-tolerant, film-forming composition comprising an aqueous dispersion of a water-insoluble interpolymer containing a water-soluble non-ionic polyethoxyethanol emulsifying agent, said dispersion having a pH between 8 and 10, said interpolymer being made up of (A) units having carboxylate groups from at least one polymerizable $\alpha,\beta$-unsaturated vinylidene carboxylic acid, (B) units from at least one polymerizable ester which by itself forms soft polymers and which is selected from the class consisting of esters of acrylic acid and primary alkanols of 1 to 18 carbon atoms, esters of acrylic acid and secondary alkanols of 1 to 18 carbon atoms, esters of methacrylic acid and primary alkanols of 5 to 18 carbon atoms, esters of methacrylic acid and secondary alkanols of 5 to 18 carbon atoms, and (C) units from at least one polymerizable monovinylidene compound which by itself forms a hard polymer and which is selected from the class consisting of alkyl methacrylates in which the alkyl group has 1 to 4 carbon atoms, tert-amyl methacrylate, tert-butyl acrylate, tert-amyl acrylate, cyclohexyl acrylate, and cyclohexyl methacrylate, the carboxylate units constituting between 0.5 and 2.5% of the interpolymer and being at least sufficient to impart stability and freeze-tolerance to the dispersion of interpolymer, the proportion of units from the soft polymer-forming ester being sufficient to cause the dispersion of interpolymer to form adhesive and cohesive films at an application temperature of about 35° C., the ratio of units from said ester to units from said compound being between 9:1 and 1:20.

2. A freeze-tolerant, film-forming composition comprising an aqueous dispersion of a water-insoluble interpolymer containing a water-soluble non-ionic polyethoxyethanol emulsifying agent, said dispersion having a pH between 8 and 10, said interpolymer being made up of (A) units having carboxylate groups from at least one polymerizable $\alpha,\beta$-unsaturated vinylidene carboxylic acid (B) units from at least one polymerizable ester which by itself forms soft polymers and which is selected from the class consisting of esters of acrylic acid and primary alkanols of 1 to 18 carbon atoms, esters of acrylic acid and secondary alkanols of 1 to 18 carbon atoms, esters of methacrylic acid and primary alkanols of 5 to 18 carbon atoms, esters of methacrylic acid and secondary alkanols of 5 to 18 carbon atoms, and (C) units from at least one polymerizable monovinylidene compound which by itself forms a hard polymer and which is selected from the class consisting of alkyl methacrylates in which the alkyl group has 1 to 4 carbon atoms, tert-amyl methacrylate, tert-butyl acrylate, tert-amyl acrylate, cyclohexyl acrylate, and cyclohexyl methacrylate, the carboxylate units constituting between 0.5 and 2.5% of the interpolymer and being at least sufficient to impart stability and freeze-tolerance to the dispersion of interpolymer, the proportion of units from the soft polymer-forming ester being sufficient to cause the dispersion of interpolymer to form adhesive and cohesive films at an application temperature of about 35° C., the proportion of units from the hard polymer-forming compound being sufficient to impart toughness and water-resistance to a film from the dispersed interpolymer and to prevent film formation at an application temperature below about 20° C., the ratio of units from said ester to units from said compound being between 9:1 and 1:20.

3. A freeze-tolerant, film-forming composition comprising an aqueous dispersion of a water-insoluble interpolymer containing a water-soluble non-ionic polyethoxyethanol emulsifying agent, said dispersion having a pH from 9 to 9.8, said interpolymer being made up of (A) units having carboxylate groups from a polymerizable α,β-unsaturated vinylidene carboxylic acid, (B) units from a polymerizable ester which by itself forms soft polymers and which is selected from the class consisting of esters of acrylic acid and primary alkanols of 1 to 18 carbon atoms, esters of acrylic acid and secondary alkanols of 1 to 18 carbon atoms, esters of methacrylic acid and primary alkanols of 5 to 18 carbon atoms, esters of methacrylic acid and secondary alkanols of 5 to 18 carbon atoms, and (C) units from a polymerizable monovinylidene compound which by itself forms a hard polymer and which is selected from the class consisting of alkyl methacrylates in which the alkyl group has 1 to 4 carbon atoms, tert-amyl methacrylate, tert-butyl acrylate, tert-amyl acrylate, cyclohexyl acrylate, and cyclohexyl methacrylate, the carboxylate units constituting between 0.5 and 2.5% of the interpolymer and being at least sufficient to impart stability and freeze-tolerance to the dispersion of interpolymer, the proportion of units from the soft polymer-forming ester being sufficient to cause the dispersion of interpolymer to form adhesive and cohesive films at an application temperature of about 35° C., the ratio of units from said ester to units from said compound being between 9:1 and 1:20.

4. A freeze-tolerant, film-forming composition comprising an aqueous dispersion of a water-insoluble interpolymer containing a water-soluble non-ionic polyethoxyethanol emulsifying agent, said dispersion having a pH from 9 to 9.8, said interpolymer being made up of (A) units having carboxylate groups from a polymerizable α,β-unsaturated vinylidene carboxylic acid, (B) units from a polymerizable ester which by itself forms soft polymers and which is selected from the class consisting of esters of acrylic acid and primary alkanols of 1 to 18 carbon atoms, esters of acrylic acid and secondary alkanols of 1 to 18 carbon atoms, esters of methacrylic acid and primary alkanols of 5 to 18 carbon atoms, esters of methacrylic acid and secondary alkanols of 5 to 18 carbon atoms, and (C) units from a polymerizable monovinylidene compound which by itself forms a hard polymer and which is selected from the class consisting of alkyl methacrylates in which the alkyl group has 1 to 4 carbon atoms, tert-amyl methacrylate, tert-butyl acrylate, tert-amyl acrylate, cyclohexyl acrylate, and cyclohexyl methacrylate, the carboxylate units constituting between 0.5 and 2.5% of the interpolymer and being at least sufficient to impart stability and free-tolerance to the dispersion of interpolymer, the proportion of units from the soft polymer-forming ester being sufficient to cause the dispersion of interpolymer to form adhesive and cohesive films at an application temperature of about 35° C., the proportion of units from the hard polymer-forming compound being sufficient to impart toughness and water-resistance to a film from the dispersed interpolymer and to prevent film formation at an application temperature below about 20° C., the ratio of units from said ester to units from said compound being between 9:1 and 1:20.

5. A water-base coating composition comprising the composition of claim 4 having pigment admixed therewith.

6. A water-base coating composition comprising the suspension of interpolymer of claim 4 having pigment dispersed therein, the ratio of pigment to interpolymer being from 1:20 to 20:1.

7. A freeze-tolerant, film-forming composition comprising an aqueous dispersion of a water-insoluble interpolymer containing a water-soluble non-ionic polyethoxyethanol emulsifying agent, said dispersion containing ammonia and having a pH between 8 and 10, said interpolymer being made up of (A) units having carboxylate groups from a polymerizable α,β-unsaturated vinylidene carboxylic acid, (B) units from a polymerizable ester which by itself forms soft polymers and which is selected from the class consisting of esters of acrylic acid and primary alkanols of 1 to 18 carbon atoms, esters of acrylic acid and secondary alkanols of 1 to 18 carbon atoms, esters of methacrylic acid and primary alkanols of 5 to 18 carbon atoms, esters of methacrylic acid and secondary alkanols of 5 to 18 carbon atoms, and (C) units from a polymerizable monovinylidene compound which by itself forms a hard polymer and which is selected from the class consisting of alkyl methacrylates in which the alkyl group has 1 to 4 carbon atoms, tert-amyl methacrylate, tert-butyl acrylate, tert-amyl acrylate, cyclohexyl acrylate, and cyclohexyl methacrylate, the ammonium carboxlate units constituting between 0.5 and 2.5% of the interpolymer and being sufficient to impart stability and freeze-tolerance to the dispersion of interpolymer, the proportion of units from the soft polymer-forming ester being at least sufficient to cause the dispersion of interpolymer to form adhesive and cohesive films at an application temperature of about 35° C., the proportion of units from the hard polymer-forming compound being sufficient to impart toughness and water-resistance to a film from the dispersed interpolymer, the ratio of units from said ester to units from said compound being between 9:1 and 1:20.

8. A freeze-tolerant, film-forming composition comprising an aqueous dispersion of a water-insoluble interpolymer containing a water-soluble non-ionic polyethoxyethanol emulsifying agent, said dispersion containing ammonia and potassium and having a pH between 8 and 10, said interpolymer being made up of (A) units having carboxylate groups from a polymerizable α-β-unsaturated vinylidene carboxylic acid, (B) units from a polymerizable ester which by itself forms soft polymers and which is selected from the class consisting of esters of acrylic acid and primary alkanols of 1 to 18 carbon atoms, esters of acrylic acid and secondary alkanols of 1 to 18 carbon atoms, esters of methacrylic acid and primary alkanols of 5 to 18 carbon atoms, esters of methacrylic acid and secondary alkanols of 5 to 18 carbon atoms, and (C) units from a polymerizable monovinylidene compound which by itself forms a hard polymer and which is selected from the class consisting of alkyl methacrylates in which the alkyl group has 1 to 4 carbon atoms, tert-amyl methacrylate, tert-butyl acrylate, tert-amyl acrylate, cyclohexyl acrylate, and cyclohexyl methacrylate, the ammonium and potassium carboxylate units constituting between 0.5 and 2.5% of the interpolymer and being sufficient to impart stability and freeze-tolerance to the dispersion of interpolymer, the proportion of units from the soft polymer-forming ester being at least sufficient to cause the dispersion of interpolymer to form adhesive and cohesive films at an application temperature of about 35° C., the proportion of units from the hard polymer-forming compound being sufficient to impart toughness and water-resistance to a film from the dispersed interpolymer, the ratio of units from said ester to units from said compound being between 9:1 and 1:20.

9. A freeze-tolerant, film-forming composition comprising an aqueous dispersion of a water-insoluble interpolymer containing a water-soluble non-ionic polyethoxyethanol emulsifying agent, said dispersion containing potassium and having a pH between 8 and 10, said interpolymer being made up of (A) units having carboxylate groups from a polymerizable α,β-unsaturated vinylidene carboxylic acid, (B) units from a polymerizable ester which by itself forms soft polymers and which is selected from the class consisting of esters of acrylic acid and primary alkanols of 1 to 18 carbon atoms, esters of acrylic acid and secondary alkanols of 1 to 18 carbon atoms, esters of methacrylic acid and primary alkanols of 5 to 18 carbon atoms, esters of methacrylic acid and secondary alkanols of 5 to 18 carbon atoms, and (C) units from a polymerizable monovinylidene compound which by itself forms a hard polymer and which is selected from the class consisting of alkyl methacrylates in which the alkyl group has 1 to 4 carbon atoms, tert-amyl methacrylate, tert-butyl acrylate, tert-amyl acrylate, cyclohexyl acrylate, and cyclohexyl methacrylate, the potassium carboxylate units constituting between 0.5 and 2.5% of the interpolymer and being sufficient to impart stability and freeze-tolerance to the dispersion of interpolymer, the proportion of units from the soft polymer-forming ester being at least sufficient to cause the dispersion of interpolymer to form adhesive and cohesive films at an application temperature of about 35° C., the proportion of units from the hard polymer-forming compound being sufficient to impart toughness and water-resistance to a film from the dispersed interpolymer, the ratio of units from said ester to units from said compound being between 9:1 and 1:20.

10. A freeze-tolerant, film-forming composition comprising a dispersion of a water-insoluble interpolymer dispersed in an aqueous medium containing 1 to 7% of a water-soluble nonionic polyethoxyethanol emulsifying agent, said medium containing ammonia and having a pH between 8 and 10, said interpolymer being made up of (A) units having ammonium carboxylate groups from methacrylic acid, (B) units from a neutral, free radical-polymerizable ester which has one vinylidene group attached to its functional group and which by itself forms soft polymers selected from the class consisting of esters of acrylic acid and primary alkanols of 1 to 18 carbon atoms, esters of acrylic acid and secondary alkanols of 1 to 18 carbon atoms, esters of methacrylic acid and primary alkanols of 5 to 18 carbon atoms, and esters of methacrylic acid and secondary alkanols of 5 to 18 carbon atoms, and (C) units from methyl methacrylate, the units having ammonium carboxylate groups comprising between 0.5 and 2.5% of the interpolymer, the proportion of units from said ester being at least sufficient to cause the dispersion of interpolymer to form adhesive and cohesive films at an application temperature of about 35° C., the ratio of units from said ester to units from said methyl methacrylate being between 6:1 and 1:3.

11. A water-base coating composition comprising the dispersion of interpolymer of claim 10 having pigment admixed therewith in a ratio of pigment to interpolymer of between 1:20 and 20:1.

12. A freeze-tolerant, film-forming composition comprising a dispersion of a water-insoluble interpolymer dispersed in an aqueous medium containing 1 to 7% of a water-soluble nonionic polyethoxyethanol emulsifying agent, said medium containing ammonia and having a pH between 8 and 10, said interpolymer being made up of (A) units having ammonium carboxylate groups from acrylic acid, (B) units from a neutral, free radical-polymerizable ester which has one vinylidene group attached to its functional group and which by itself forms soft polymers selected from the class consisting of esters of acrylic acid and primary alkanols of 1 to 18 carbon atoms, esters of acrylic acid and secondary alkanols of 1 to 18 carbon atoms, esters of methacrylic acid and primary alkanols of 5 to 18 carbon atoms, and esters of methacrylic acid and secondary alkanols of 5 to 18 carbon atoms, and (C) units from methyl methacrylate, the units having ammonium carboxylate groups comprising between 0.5 and 2.5% of the interpolymer, the proportion of units from said ester being at least sufficient to cause the dispersion of interpolymer to form adhesive and cohesive films at an application temperature of about 35° C., the ratio of units from said ester to units from said methyl methacrylate being between 6:1 and 1:3.

13. A water-base coating composition comprising the dispersion of interpolymer of claim 12 having pigment admixed therewith in a ratio of pigment to interpolymer of between 1:20 and 20:1.

14. A freeze-tolerant, film-forming composition comprising a dispersion of a water-insoluble interpolymer dispersed in an aqueous medium containing 1 to 7% of a water-soluble non-ionic polyethoxyethanol emulsifying agent, said medium containing ammonia and having a pH of 9.3 to 9.6, said interpolymer being made up of (A) units having carboxylate groups from methacrylic acid, the amount thereof being from 0.8 to 2% of the interpolymer, (B) units from ethyl acrylate, and (C) units from methyl methacrylate, the ratio of the (B) units to the (C) units being between 6:4 and 7:3.

15. A freeze-tolerant, film-forming composition comprising a dispersion of a water-insoluble interpolymer dispersed in an aqueous medium containing 1 to 7% of a water-soluble non-ionic polyethoxyethanol emulsifying agent, said medium containing ammonia and having a pH of 9.3 to 9.6, said interpolymer being made up of (A) units having carboxylate groups from acrylic acid, the amount thereof being from 0.8 to 2% of the interpolymer, (B) units from ethyl acrylate, and (C) units from methyl methacrylate, the ratio of the (B) units to the (C) units being between 6:4 and 7:3.

16. A process for preparing a stable, freeze-tolerant dispersion of a film-forming interpolymer which comprises dispersing in an aqueous medium containing a water-soluble non-ionic emulsifying agent in concentration between 1 and about 7% of the weight of the solution thereof (A) a polymerizable carboxylate from the class consisting of acrylic, methacrylic, and itaconic acids, and water-soluble salts thereof, (B) at least one polymerizable ester from the class consisting of esters of acrylic acid and primary and secondary alkanols of 1 to 18 carbon atoms, esters of methacrylic acid and primary and secondary alkanols of five to eighteen carbon atoms, and (C) at least one polymerizable monovinylidene compound from the class consisting of alkyl methacrylates in which the alkyl group has 1 to 4 carbon atoms, tert-amyl methacrylate, tert-amyl acrylate, tert-butyl acrylate, cyclohexyl methacrylate, and cyclohexyl acrylate, there being 0.5 to 2.5% of said carboxylate in the mixture, the proportion thereof being sufficient to impart stability, viscosity, and freeze-tolerance to the resulting interpolymer and insufficient to impart water-sensitivity thereto, the ratio of said ester to said compound being within the proportions of 9:1 and 1:20 and being at least sufficient to permit forming an adhesive and cohesive film at a temperature of application of the interpolymer of about 35° C., and the ratio of said compound to said ester being sufficient to impart to a film of interpolymer toughness and resistance to swelling in water, supplying to the emulsified mixture a peroxidic polymerization catalyst which is soluble therein and a soluble sulfite reducing agent to form a redox system, interpolymerizing said mixture between about 15° and about 80° C., whereby a water-insoluble interpolymer is formed in aqueous dispersion, and adjusting the pH of the dispersion to a value from 9 to 9.8 with at least one substance of the class consisting of ammonia, water-soluble amines, and an alkali metal base.

17. A process for preparing a stable, freeze-tolerant dispersion of a film-forming interpolymer which comprises dispersing in an aqueous medium containing a water-soluble non-ionic emulsifying agent in concentration between 1 and about 7% of the weight of the solution thereof (A) a polymerizable carboxylate from the class consisting of acrylic, methacrylic, and itaconic acids, and water-soluble salts thereof, (B) at least one polymerizable ester from the class consisting of esters of acrylic acid and primary and secondary alkanols of 1 to 18 carbon atoms, esters of methacrylic acid and primary and secondary alkanols of five to eighteen carbon atoms, and (C) at least one polymerizable monovinylidene compound from the class consisting of alkyl methacrylates in which the alkyl group has not over four carbon atoms, tert-amyl methacrylate, tert-amyl acrylate, tert-butyl acrylate, cyclohexyl acrylate, and cyclohexyl methacrylate, there being 0.5 to 2.5% of said acid in the mixture, the proportion thereof being sufficient to impart stability, viscosity, and freeze-tolerance to the resulting interpolymer and insufficient to impart water-sensitivity thereto, the ratio of said ester to said compound being within the proportions of 9:1 and 1:20 and being at least sufficient to permit forming an adhesive and cohesive film at a temperature of application of the interpolymer of about 35° C., and the ratio of said compound to said ester being sufficient to impart to a film of interpolymer toughness and resistance to swelling in water, supplying to the emulsified mixture a peroxidic polymerization catalyst which is soluble therein and a soluble sulfite reducing agent to form a redox system, interpolymerizing said mixture between about 15° C. and about 80° C., whereby a water-insoluble interpolymer is formed in aqueous dispersion, and adjusting the pH of the dispersion to a value from 9 to 9.8 with ammonia.

18. A process for preparing a stable, freeze-tolerant dispersion of a film-forming interpolymer which comprises dispersing in an aqueous medium containing a water-soluble non-ionic emulsifying agent in a concentration between 1 and about 7% of the weight of the solution thereof (A) methacrylic acid, (B) an ester of acrylic acid and a non-tertiary alkanol of not over 12 carbon atoms, and (C) methyl methacrylate, there being between 0.5 and 2.5% of said acid in the mixture, the proportion thereof being sufficient to impart stability, viscosity, and freeze-tolerance to the interpolymer formed, but insufficient to impart water-sensitivity thereto, the ratio of said ester to said methacrylate being from about 6:1 to 1:3 and being at least sufficient to permit forming a tough, adhesive and cohesive film at a temperature of application of the interpolymer of about 35° C., supplying to the emulsified mixture a peroxidic polymerization catalyst which is soluble therein, promoting interpolymerization in the presence of a redox system between about 15° C. and about 80° C., and adjusting the pH of the resulting interpolymer with ammonia to a value from 9 to 9.8.

19. The process of claim 18 wherein the said ester is ethyl acrylate.

20. A process for preparing a stable, freeze-tolerant dispersion of a film-forming interpolymer which comprises dispersing in an aqueous medium containing a water-soluble non-ionic emulsifying agent in a concentration between 1% and about 7% of the weight of the solution thereof (A) acrylic acid, (B) an ester of acrylic acid and a non-tertiary alkanol of not over 12 carbon atoms, and (C) methyl methacrylate, there being between 0.5 and 2.5% of said acid in the mixture, the proportion thereof being sufficient to impart stability, viscosity, and freeze-tolerance to the interpolymer formed, but insufficient to impart water-sensitivity thereto, the ratio of said ester to said methacrylate being from about 6:1 to 1:3 and being at least sufficient to permit forming a tough, adhesive and cohesive film at a temperature of application of the interpolymer of about 35° C., supplying to the emulsified mixture a peroxidic polymerization catalyst which is soluble therein, promoting interpolymerization in the presence of a redox system between about 15° C. and about 80° C., and adjusting the pH of the resulting interpolymer with ammonia to a value from 9 to 9.8.

References Cited in the file of this patent

UNITED STATES PATENTS

| | | |
|---|---|---|
| 2,536,018 | Schoenholz et al. | Jan. 2, 1951 |
| 2,536,470 | Schoenholz et al. | Jan. 2, 1951 |
| 2,570,253 | Lundquist | Oct. 9, 1951 |

OTHER REFERENCES

Modern Plastics, September 1947, pages 128 to 129.

Ser. No. 397,138, Fikentscher et al. (A. P. C.), published May 11, 1943.